(12) United States Patent
Leiby et al.

(10) Patent No.: US 6,886,533 B2
(45) Date of Patent: May 3, 2005

(54) INTERNAL COMBUSTION ENGINE WITH MULTIPLE INTAKE VALVES AND VARIABLE VALVE ACTUATION AND TIMING

(75) Inventors: James Leiby, Dryden, MI (US); Robert Albert Stein, Saline, MI (US); Stephen George Russ, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 74 days.

(21) Appl. No.: 10/248,272

(22) Filed: Jan. 3, 2003

(65) Prior Publication Data

US 2004/0129254 A1 Jul. 8, 2004

(51) Int. Cl.$^7$ ................................................ F02B 15/00
(52) U.S. Cl. .................. 123/432; 123/90.11; 123/90.15
(58) Field of Search ................................. 123/302, 308, 123/432, 90.15, 90.16, 90.17, 90.11

(56) References Cited

U.S. PATENT DOCUMENTS

| 4,777,914 A | 10/1988 | Konno |
| 5,222,465 A | 6/1993 | Sakamoto et al. |
| 5,230,320 A | 7/1993 | Hitomi et al. |
| 5,233,948 A | 8/1993 | Boggs et al. |
| 5,269,270 A | 12/1993 | Suzuki et al. |
| 5,669,341 A | 9/1997 | Ushirono et al. |
| 5,878,714 A | 3/1999 | Dai et al. |
| 5,950,582 A | 9/1999 | Stein |
| 5,957,096 A | 9/1999 | Clarke et al. |
| 5,960,755 A | 10/1999 | Diggs et al. |
| 6,311,653 B1 * | 11/2001 | Hamamoto ............... 123/90.11 |
| 6,640,771 B2 * | 11/2003 | Fuerhapter .................. 123/295 |
| 2003/0209228 A1 * | 11/2003 | Miura ......................... 123/399 |

* cited by examiner

Primary Examiner—Hai Huynh

(57) ABSTRACT

A four-stroke cycle reciprocating internal combustion engine includes a piston mounted for reciprocal movement within a power cylinder and primary and secondary intake valves. The primary valve has a fixed event, in terms of both duration and lift, and the secondary valve has variable duration and lift. Although the timing of the primary and secondary valve events may be retarded from a standard timing value, both valves close at the same time regardless of the presence of timing retard. The dual event strategy, combined with camshaft timing retard for part load conditions, produces excellent charge motion by staggering the respective lifted flow areas of the primary and secondary valve events and by delaying the secondary valve opening.

11 Claims, 3 Drawing Sheets

INTERNAL COMBUSTION ENGINE WITH MULTIPLE INTAKE VALVES AND VARIABLE VALVE ACTUATION AND TIMING

BACKGROUND OF INVENTION

1. Field of the Invention

The present invention relates to a system for controlling a reciprocating internal combustion engine having at least two intake valves per cylinder, such that the first valve is operated with a fixed duration event, and the second valve is operated with a variable duration event, with the timing of both of the valves being controllable and variable.

2. Disclosure Information

Charge motion control devices (CMCV) are sometimes used in conjunction with valve event timing retard to produce higher in-cylinder charge motion. Unfortunately, the CMCV may increase the engine's pumping losses, so as to undercut the fuel economy benefit produced by a variable cam timing (VCT) system. Moreover, even when in a wide-open position, most charge motion devices will cause a measurable flow restriction, which is translatable into a power loss. Charge motion control devices have limited operation ranges because of these pumping losses.

The inventors of the present invention have determined that excellent in-cylinder charge motion may be obtained with a two intake valve induction system without the need for a CMCV, if cam switching is used on one of the intake valves. As used herein the term "cam switching" means the provision of multiple, selectable, camshaft lobes for a single valve, such that the duration, lift, and even the timing of the valve event may be controlled. It has further been determined by the present inventors that a beneficial result will be provided in the event that intake camshaft retarding is used to place the opening of the secondary intake valve midway through the intake stroke, when the piston velocity has peaked and is proceeding to decrease. When the secondary valve is operated with a reduced duration and lift, a delay in secondary intake valve opening as opposed to primary intake valve opening occurs, such that at secondary intake valve opening the primary intake valve is at or near its midlift position. This lift staggering effect, coupled with the timing of the secondary valve opening relative to piston velocity biases most of the incoming air charge to flow past the primary valve. Biasing incoming air charge to one valve is similar to deactivating a valve and creates good in cylinder charge motion. In the present inventive system, a secondary intake valve is in essence operated with a lower event duration and lift so that flow is limited past the secondary valve and excellent charge mixing and charge motion occur because of the high airflow through the primary intake valve.

The Honda VTEC-E system which is employed without variable camshaft timing, switches a single intake valve from long to short duration and from a higher to lower lift to promote charge motion and mixing. Because the Honda VTEC-E system does not employ intake cam retard, flow past the secondary valve must be mechanically limited by using very short duration and low lift. This in turn impairs the efficiency of the engine.

A Honda cam switching mechanism itself may, however, be used as a component part of an engine according to the present invention, and U.S. Pat. No. 4,777,914, which describes such a mechanism, is hereby incorporated by reference into this specification.

SUMMARY OF INVENTION

A four-stroke cycle reciprocating internal combustion engine includes a piston mounted reciprocably within a power cylinder, a primary intake valve having a fixed duration event and variable valve timing, and a secondary intake valve having a variable duration and lift event and variable valve timing. The primary intake preferably has a standard duration event. The secondary intake valve has both a standard duration event and a reduced duration event. The second intake valve preferably closes at the same point in the engine cycle regardless of whether the secondary intake valve is being operated with the standard event or the reduced duration event. Furthermore, the primary and secondary intake valves preferably close at the same point during the engine cycle both when the secondary intake valve is operating with a standard duration event as well as when the secondary intake valve is operating with a reduced duration event. The timing of the primary and secondary intake valve events may be retarded and the secondary valve operated with the reduced duration event such that the secondary intake valve does not open during the intake stroke until maximum piston speed is reached, or even after max piston speed is reached. Viewed in another manner, the timing of the primary and secondary intake valves may be retarded when the secondary valve is being operated with a reduced duration such that the secondary intake valve opens during the intake stroke at approximately 80 crankshaft degrees after top dead center (ATDC).

The primary and secondary intake valve may be driven by a common camshaft having a camshaft timing control system with the actuator or drive for the secondary valve further comprising a cam lobe switching system.

According to another aspect of the present invention, a reduced duration event for the secondary valve may be characterized by approximately a 50% reduction in valve lift and a 20% reduction in duration, as compared with standard lift and duration.

According to another aspect of the present invention, a method for operating the cylinder valves of a reciprocating internal combustion engine includes the steps of operating a primary intake valve with a fixed duration event, operating a secondary intake valve with variable duration and lift events, and controlling the timing of the primary and secondary intake valves such that the closing of both the primary and secondary intake valves will occur at the same time, regardless of the duration and lift at which the secondary intake valve is being operated.

According to another aspect of the present invention, the present method may include retarding the timing of the primary and secondary intake valve events at part load, and operating the secondary intake valve to reduce the duration and lift such that the secondary intake valve will begin to open at approximately 75 crankshaft degrees after top dead center on the intake stroke. This retarded timing may involve opening of the primary intake valve at about 30 crankshaft degrees after top dead center.

It is an advantage of the present invention that a system and method according to this invention will allow excellent charge motion without the pumping work associated with a cam switching system.

It is another advantage of the present invention that the need for a charge motion control valve will be eliminated for engines otherwise requiring high charge motion at idle and low-speed operation, or more generally, part load conditions.

It is a further advantage of the present invention that an engine equipped with a valve control system according to the present invention will be capable of not only high specific output but also excellent charge motion at part load conditions.

DETAILED DESCRIPTION

Figure 1:
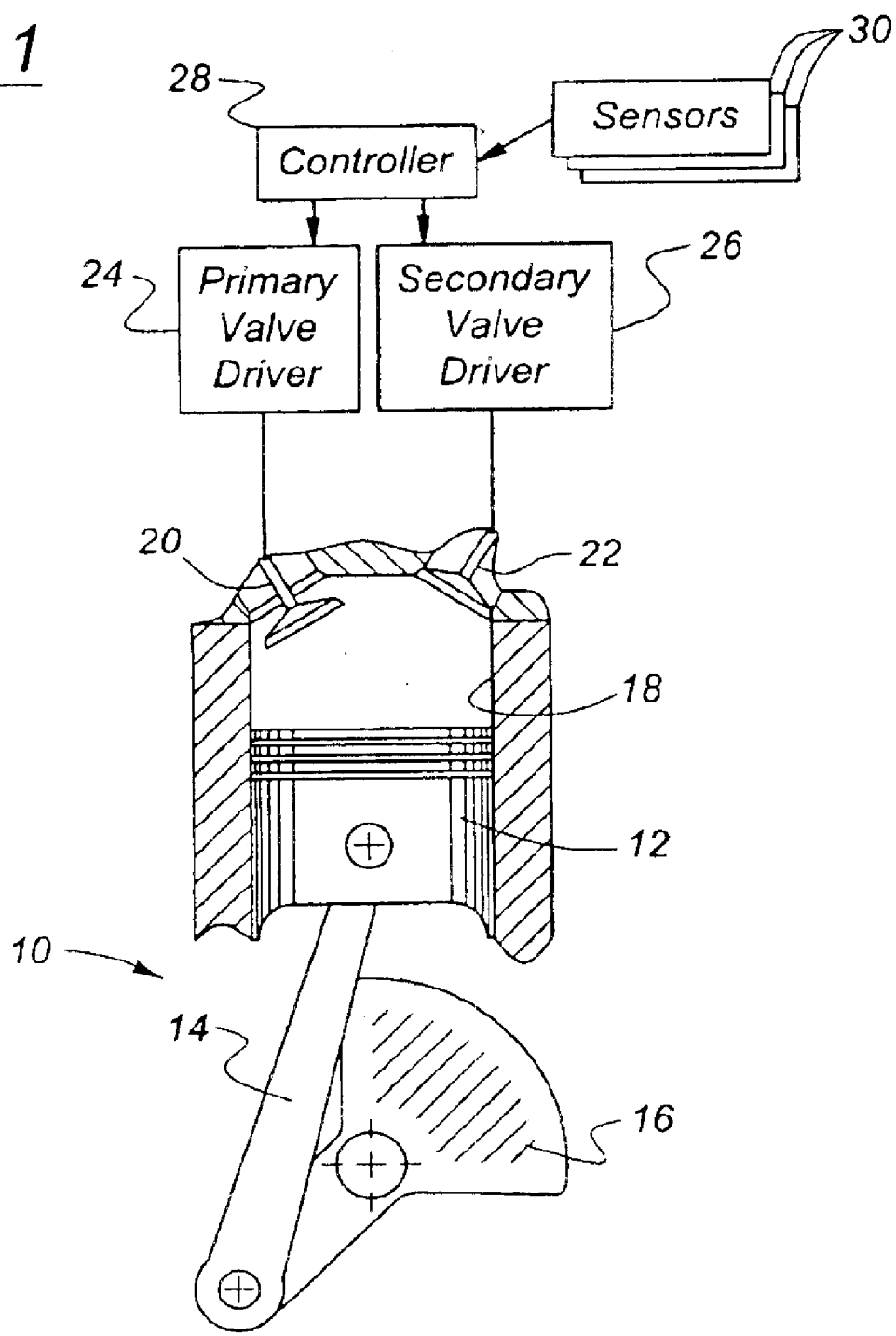
FIG. 1 is a schematic representation of an engine having a multiple intake valve control system according to the present invention.

As shown in FIG. 1, an engine according to the present invention includes piston 12 which is mounted upon connecting rod 14 and crankshaft 16 for reciprocable motion within cylinder 18. Two intake valves 20 and 22 are used. Intake valve 20 is a primary valve and is operated by primary valve driver 24. Primary valve driver 24 has the capability of changing the timing (VCT) of primary intake valve 20, but cannot change the duration and lift of primary intake valve 20. On the other hand, secondary intake valve 22, which is driven by secondary valve driver 26, may be operated with not only VCT, as is the case with primary intake valve 20, but also with a reduced duration and lift event. This reduced lift and duration may be produced by a system such as that described in the previously incorporated '914 patent. Other suitable valve event adjustment systems are known to those skilled in the art and suggested by this disclosure.

Controller 28 operates both primary valve driver 24 and secondary valve driver 26 with input from a plurality of sensors 30 which measure such engine operating parameters as throttle position, coolant temperature, ambient air temperature, atmospheric pressure, intake manifold pressure, spark timing, fuel injector pulsewidth, and other operating parameters known to those skilled in the art and suggested by this disclosure.

Figure 2:
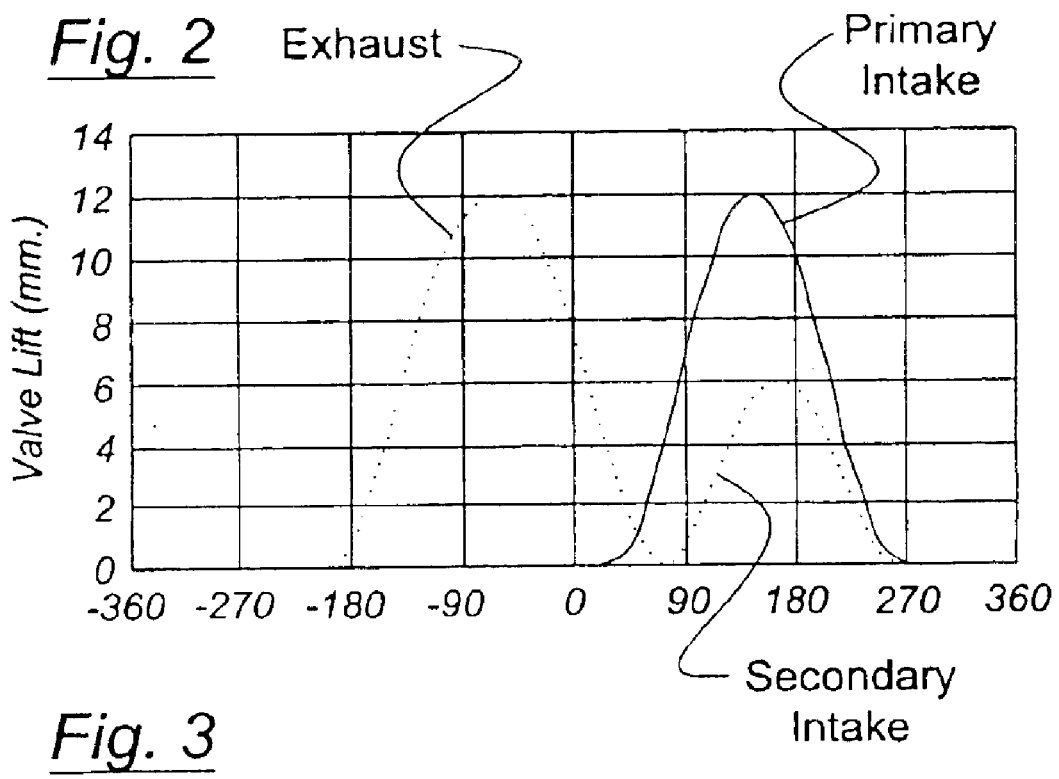
FIG. 2 illustrates intake valve lift for both primary and secondary intake valves, as well as for an exhaust valve according to but one example of an engine having a system according to the present invention.

FIG. 2 illustrates the salient points of operation of a system according to the present invention. Note that the exhaust valve, which is not shown in FIG. 1 may be of conventional construction and operation. Primary intake valve 20 has a standard duration of about 250 crank angle degrees and standard lift of about 12 mm. On the other hand, secondary intake valve 22 has a standard duration and lift equivalent to the duration and lift of primary intake valve 20, as well as a reduced lift of about 6 mm or 50% of the lift of primary intake valve 20, and a reduced duration of about 200 crank angle degrees.

As is further seen in FIG. 2, the primary and secondary intake valve events end at the same time, or in other words, at the same crank position (270 degrees ATDC for this operating condition with retarded intake timing.) Moreover this common closing point prevails even where the secondary intake valve is operated with a profile which is coincident with the lift and duration profile illustrated in FIG. 2 for primary intake valve 20. Another important aspect of the present invention illustrated in FIG. 2 is that when secondary intake valve 22 is operating with its reduced duration event, secondary intake valve 22 will begin opening during the intake stroke at approximately 75 degrees ATDC. This is significant because at 75 degrees ATDC, piston 12 has begun slowing down, and as a result, the secondary intake valve 22 does not open until the majority of the cylinder filling is completed. This is because the cylinder and intake manifold pressures are almost equal at 75 degrees after top dead center on the intake stroke.

Another advantage inherent in the present invention is that with both primary intake valve 20 and secondary intake valve 22 closing at the same point i.e. approximately 270 degrees ATDC, unrestricted backflow occurs into the intake manifold during the compression stroke, and as a consequence, intake manifold pressure is greater, and this in turn causes the throttle to be to a greater extent to achieve the desired flow into the engine. As a result, pumping loss is reduced.

Figure 3:
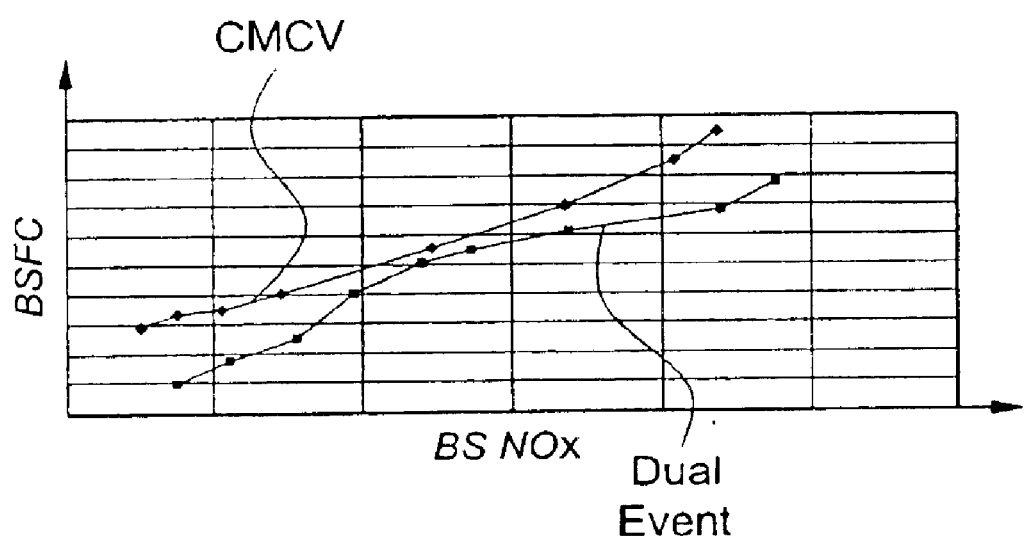
FIG. 3 illustrates fuel consumption of an engine having an intake valve control system according to the present invention, as opposed to a CMCV, with fuel consumption being plotted as a function of brake specific oxides of nitrogen (BSNOx) feedgas level.
Figure 4:
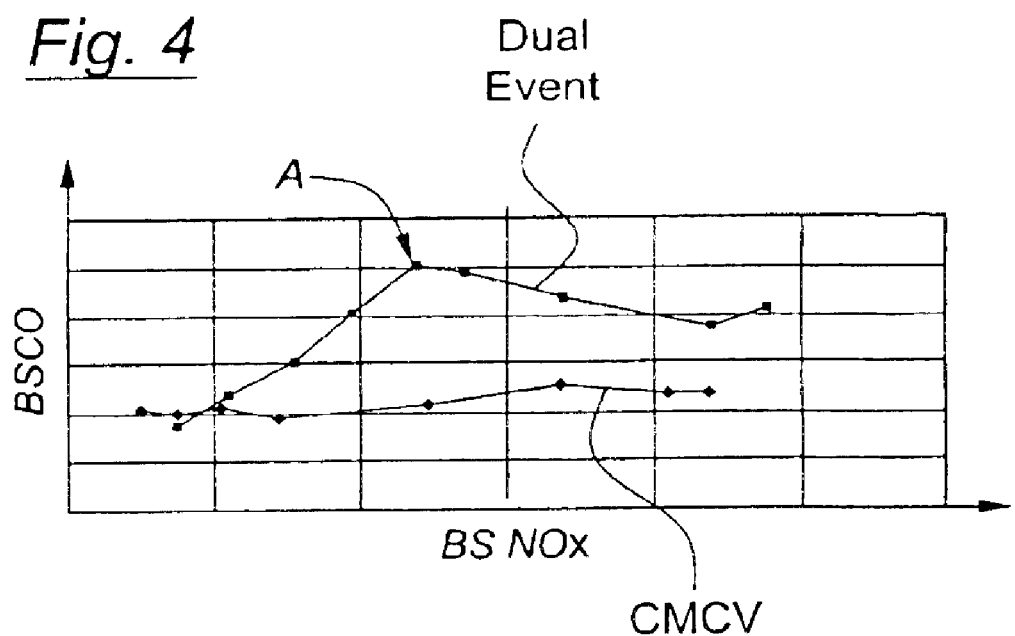
FIG. 4 illustrates a plot of carbon monoxide (CO) feedgas emission for a dual event valve control system according to the present invention, as contrasted with a CMCV-based system.
Figure 5:
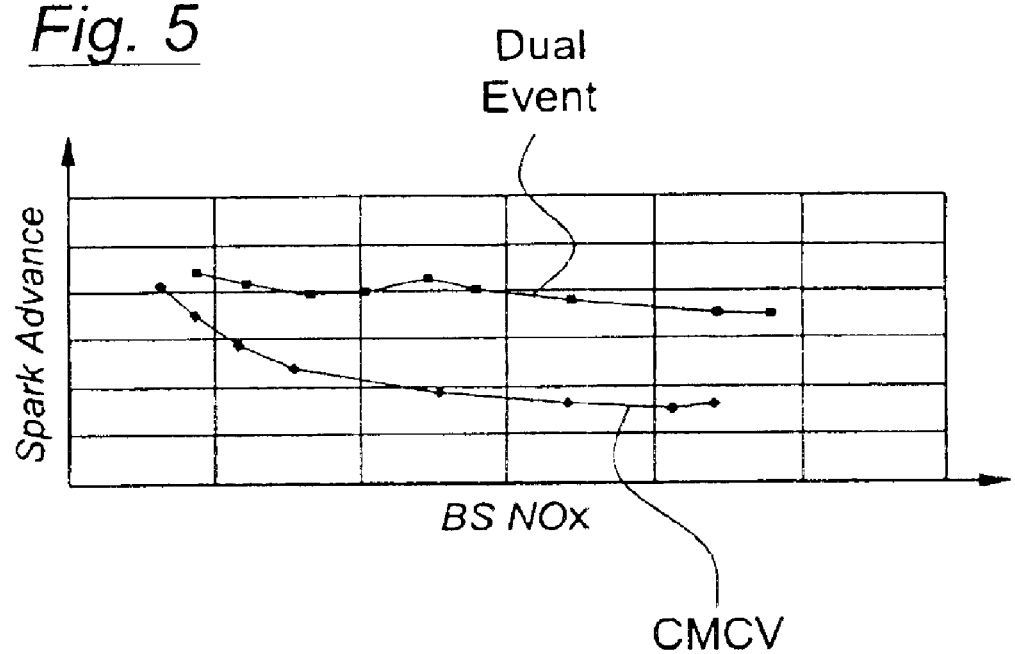
FIG. 5 illustrates minimum spark timing advance for best torque (MBT) for dual event and CMCV systems as a function of BSNOx feedgas level.

FIGS. 3, 4 and 5 illustrate advantages in terms of engine operating parameters with a system and method according to the present invention, with the intake camshaft timing retarded about 40 crankshaft degrees. In FIG. 3, the present system, which is labeled "Dual Event", is shown as causing the engine to consume less fuel than an engine having a CMCV, at equivalent NOx levels. This results because with the inventive dual valve event and retarded camshaft timing, both charge dilution and charge motion are increased, so as to offset their respective effects on burn rates and engine combustion stability. This in turn allows the engine to operate with even more retarded intake valve closing, and allows the engine to run at a higher intake manifold pressure to achieve the desired load, thereby reducing pumping work and engine fuel consumption. With the potential for increased charge dilution due to the offsetting effects of increasing charge motion and camshaft timing retard, indicated engine efficiency is improved, resulting in further fuel economy improvement.

An additional benefit of the inventive dual event strategy, as compared with a CMCV system resides in the reduction of flow restriction as air charge is pushed out of the cylinder after bottom dead center of the intake stroke. The result is a reduction of lost engine work and a concomitant increase in engine efficiency. Finally, the reduction in valve lift reduces the energy required to operate the valves, thereby reducing fuel consumption.

FIG. 5 illustrates brake specific NOx and minimum spark advance for best torque (MBT) spark timing. FIG. 5 shows that as compared with a CMCV system, the present dual event system presents the possibility of running greater spark advance, with an accompanying fuel economy improvement.

FIG. 4 illustrates carbon monoxide (CO) in the feedgas flowing from an actual engine having an intake valve control system according to the present invention in one case, and a CMCV in the other case. It is noted at point A in the dual event curve that an inflection occurs as the production of CO takes a dramatic downturn attributable to superior charge mixing.

Those skilled in the art will appreciate in view of this disclosure that primary valve driver 24 and secondary valve driver 26 could be combined into single camshaft having a camshaft timing system drawn from the range of valve drive systems known to those skilled in the art and suggested by this disclosure, combined with a cam profile switching as shown in the '914 patent. which has been incorporated by reference into this specification.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. A four-stroke cycle reciprocating internal combustion engine, comprising;
   a piston mounted reciprocably within a power cylinder;
   a primary intake valve having a fixed duration event and variable valve timing; and
   a secondary intake valve having a variable duration and lift event, a
   reduced duration and lift event and variable valve timing.

2. A reciprocating internal combustion engine according to claim 1, wherein said primary intake valve has a standard duration event.

3. A reciprocating internal combustion engine according to claim 1, wherein said secondary intake valve has both a standard duration event and a reduced duration event, with said secondary intake valve and said primary intake valve closing at the same point in the engine cycle, regardless of whether the secondary intake valve is being operated with the standard event or the reduced duration event.

4. A reciprocating internal combustion engine according to claim 1, wherein the timing of said primary and secondary intake valves is retarded and the secondary valve is operated with a reduced duration event, such that the secondary intake valve does not open approximately until maximum piston speed has occurred.

5. A reciprocating internal combustion engine according to claim 1, wherein at part load conditions the timing of said primary and secondary intake valves is retarded and the secondary valve is operated with a reduced duration, such that the secondary intake valve opens during the intake stroke at approximately 75° after top dead center.

6. An engine according to claim 1, wherein the primary intake valve and the secondary intake valve are driven by a common camshaft having a camshaft timing control system.

7. An engine according to claim 1, wherein the primary intake valve is driven by a primary camshaft, and the secondary intake valve are driven by a secondary camshaft, with the drive for the secondary valve further comprising a cam lobe switching system.

8. A reciprocating internal combustion engine according to claim 1, wherein said primary intake valve has a standard duration event, and said secondary intake valve has a standard duration event equivalent in lift and duration to the standard duration event of said primary intake valve, with said secondary intake valve also having a reduced duration and lift event having a duration which approximates a thirty to fifty percent reduction in lift and a twenty percent reduction in duration, as compared with the standard lift and duration of said secondary valve.

9. A method for operating the cylinder valves of a four-stroke cycle reciprocating internal combustion engine, comprising the steps of:
   operating a primary intake valve with a fixed duration event;
   operating a secondary intake valve with variable duration and lift events; and
   controlling the timing of the primary and secondary intake valves such that the closing of the both the primary and the secondary intake valves will occur at the same time, regardless of the duration and lift at which the secondary intake valve is being operated.

10. A method according to claim 9, wherein the timing of the primary and secondary intake valve events is retarded at part load conditions, and the secondary intake valve is operated at a reduced duration and lift such that the secondary intake valve begins to open at approximately 75 crankshaft degrees after top dead center on the intake stroke.

11. A method according to claim 10, wherein the timing of the primary and secondary intake valve events is retarded at part load conditions, and the secondary intake valve is operated at a reduced duration and lift such that the secondary intake valve begins to open at approximately 75 crankshaft degrees after top dead center on the intake stroke and the primary intake valve begins to open at about 30 crankshaft degrees after top dead center.

* * * * *